Patented May 15, 1923.

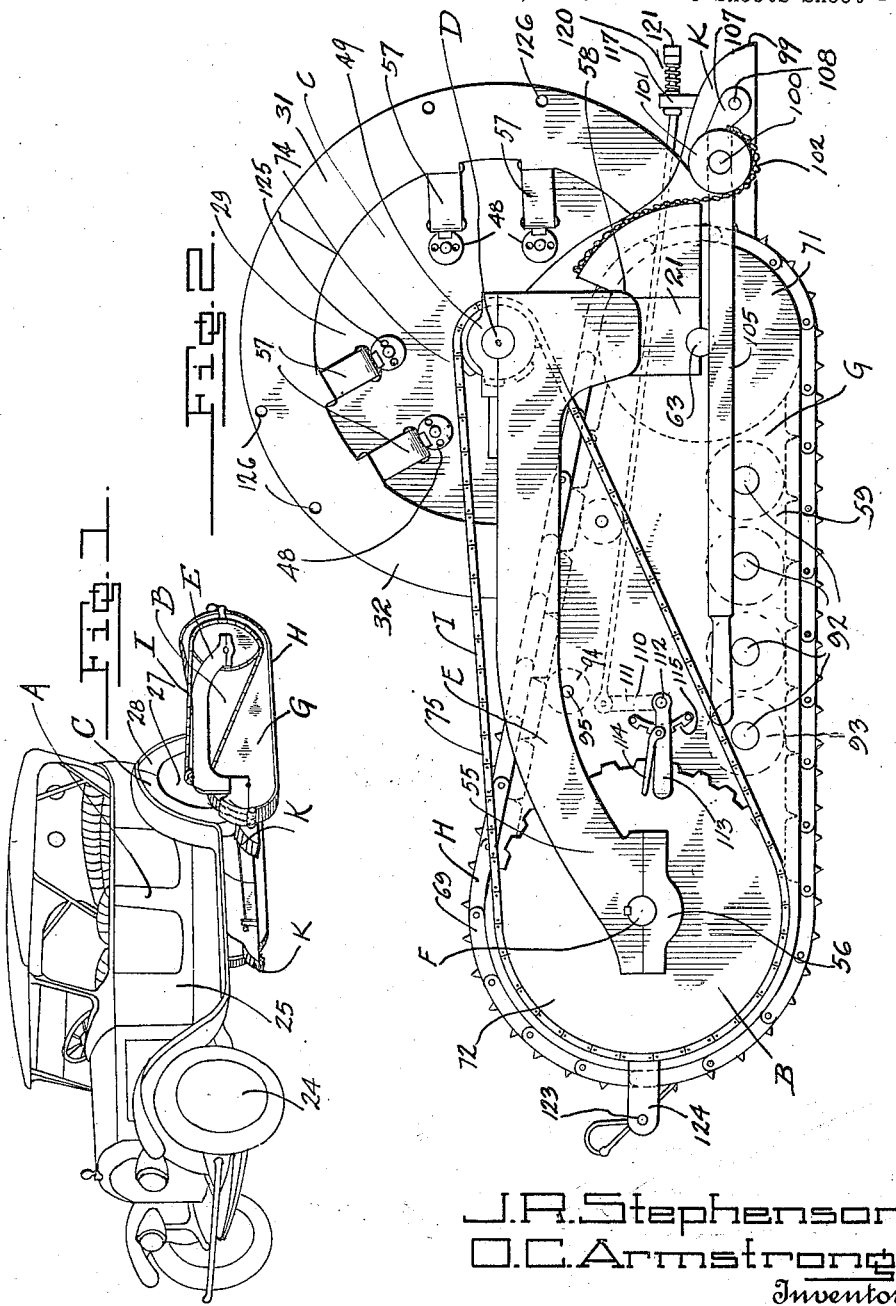

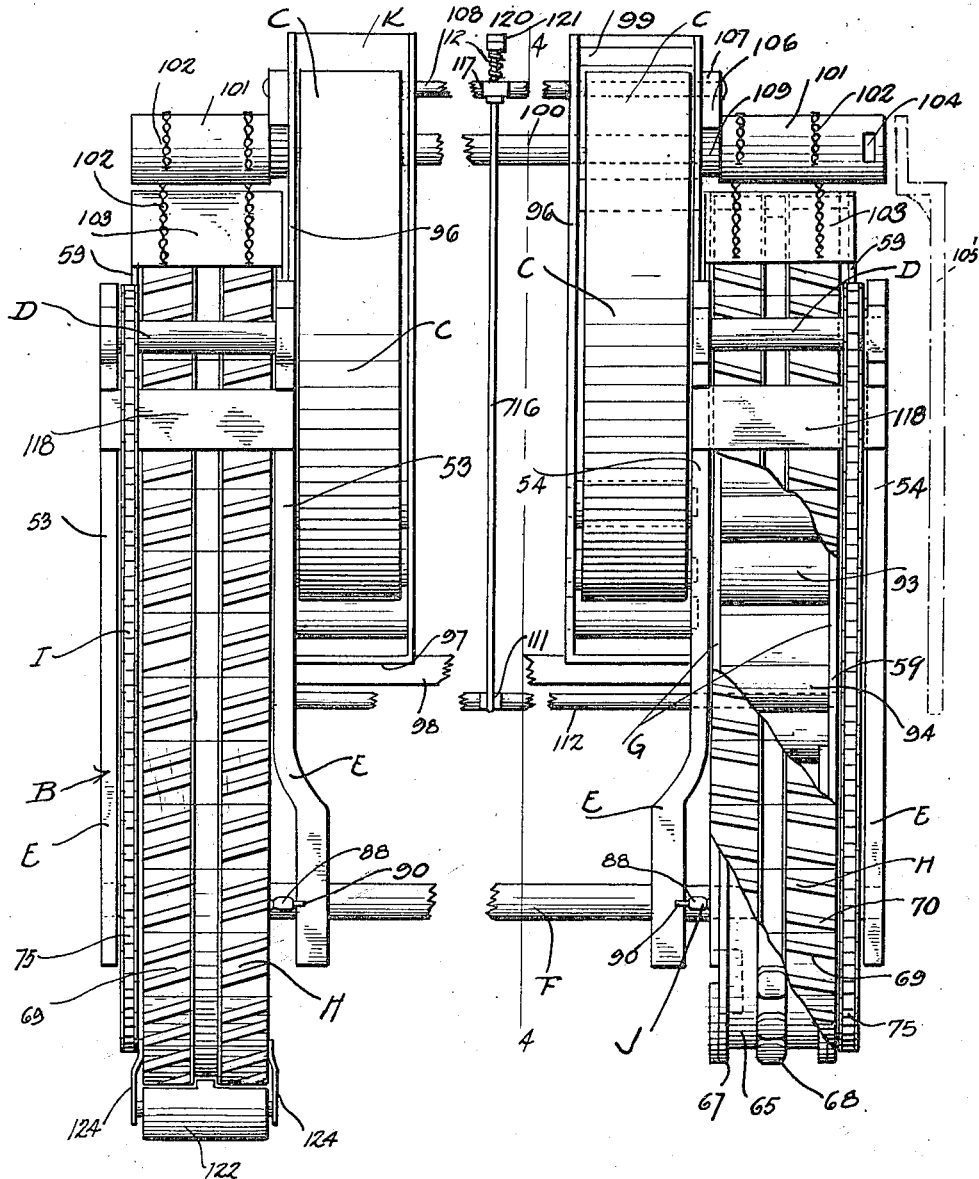

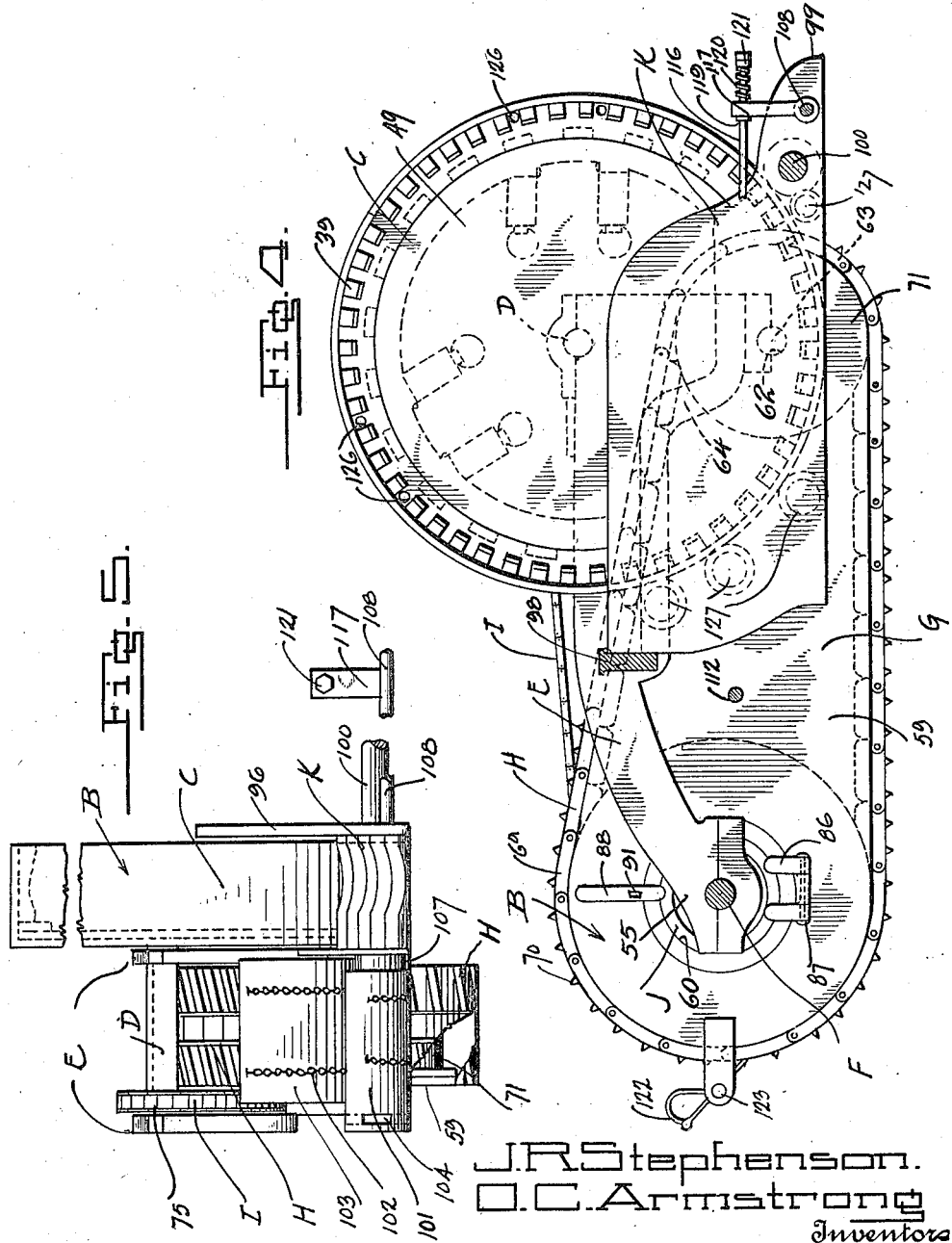

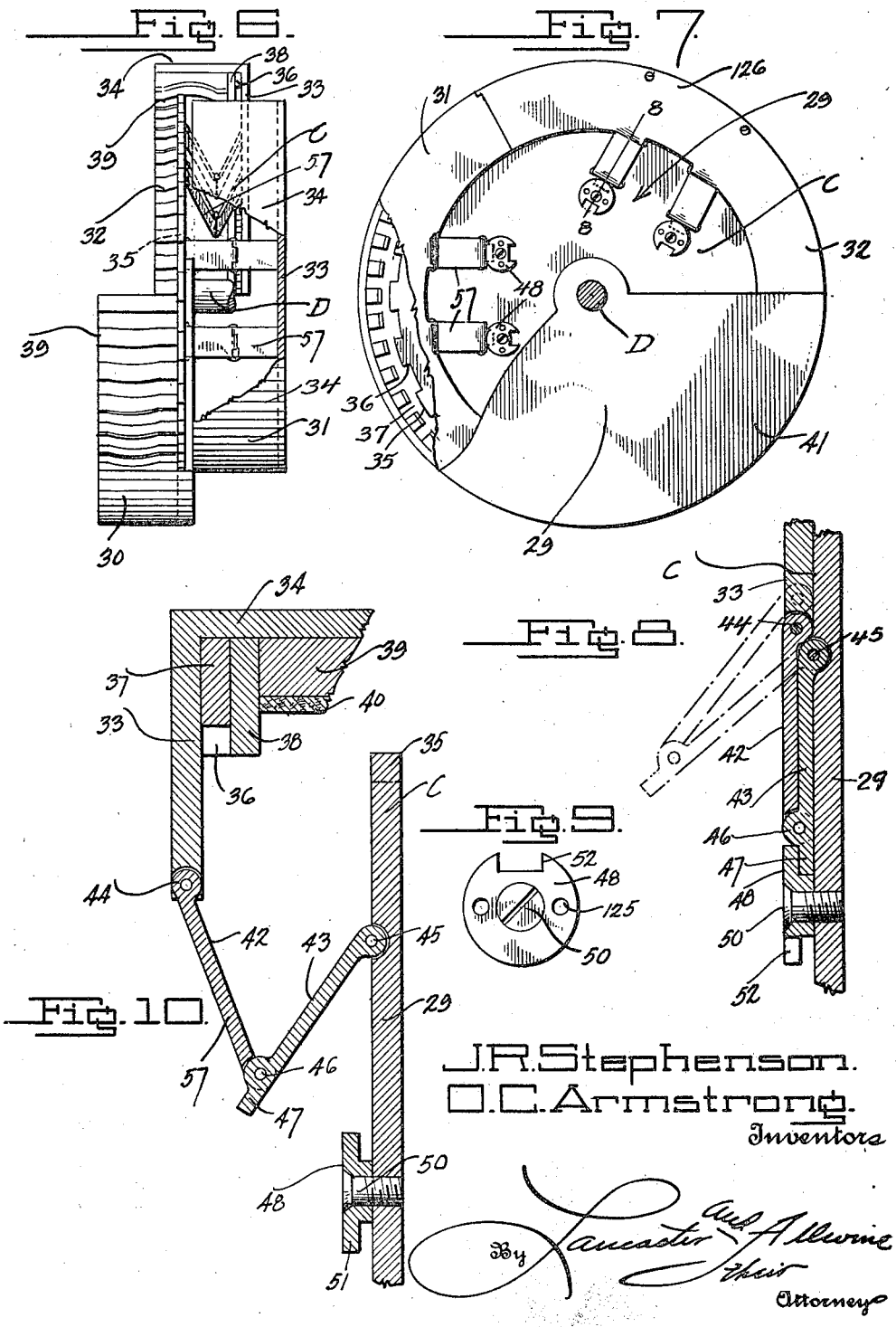

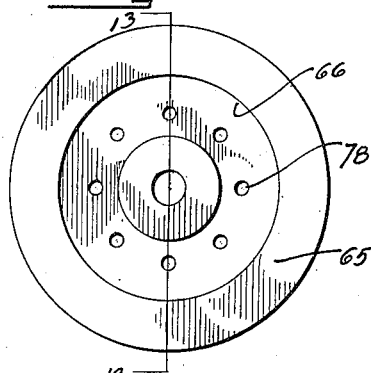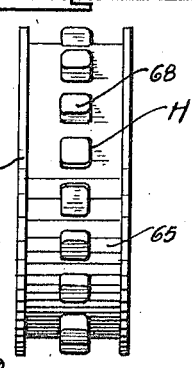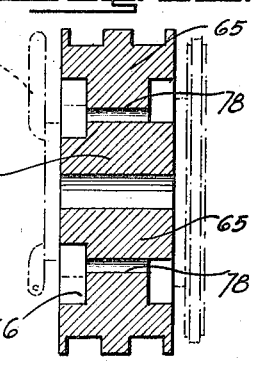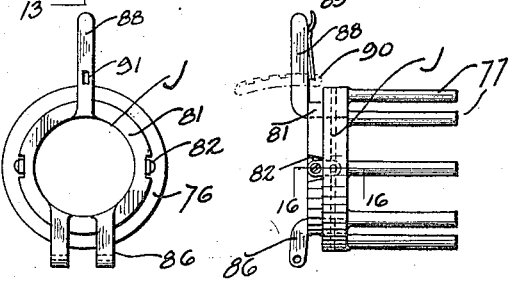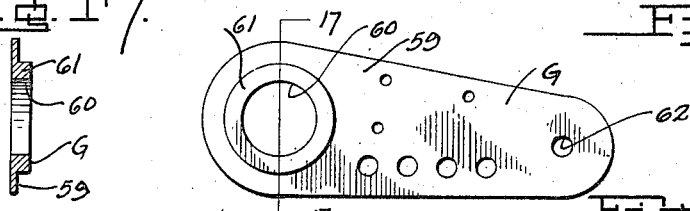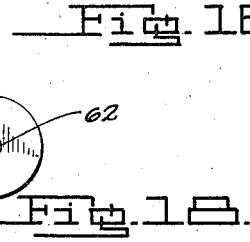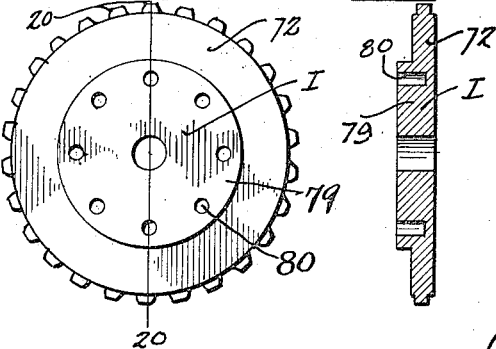

1,454,911

UNITED STATES PATENT OFFICE.

JOHN R. STEPHENSON AND OLIVER C. ARMSTRONG, OF LOS ANGELES, CALIFORNIA.

TRACTOR ATTACHMENT FOR AUTOMOBILES.

Application filed December 12, 1919. Serial No. 344,426.

*To all whom it may concern:*

Be it known that we, JOHN R. STEPHENSON and OLIVER C. ARMSTRONG, citizens of the United States, residing at Los Angeles, in the county of Los Angeles and State of California, have invented certain new and useful Improvements in Tractor Attachments for Automobiles, of which the following is a specification.

This invention relates to tractor attachments for automobiles, and the primary object of the invention is to provide an improved means for quickly and readily converting an ordinary automobile into a tractor without removing any parts thereof.

Another object of the invention is to provide an improved tractor attachment for automobiles of any size or type embodying an improved means for connecting the same with the automobile, so as to eliminate the necessity of employing a jack or other separate lifting means.

A further object of the invention is to provide a tractor attachment for automobiles embodying a novel type of gripping drum for engaging the tires of an automobile, so that the motive power for the tractor attachment may be taken directly from the drive wheels of the vehicle.

A still further object of the invention is the provision of a tractor attachment with the jacking means associated therewith so as to permit a portion of the tractor frame to be lowered for receiving the automobile and means for raising the said portion, so as to move the drive wheels of the motor vehicle out of engagement with the ground.

A still further object of the invention is the provision of improved gripping drums for grasping the tires of the rear drive wheels of a motor vehicle, which are so constructed as to permit the same to be brought into or out of engagement with the tires to facilitate the positioning of the motor vehicle on the tractor.

A still further object of the invention is the provision of means for swinging the sections of the gripping drums into engagement with the periphery of the tires of the rear drive wheels and means for releasably locking said sections in position.

A still further object of the invention is to provide an improved tractor attachment of the above character which is durable and efficient in use, one that is simple and easy to manufacture, and one which can be placed upon the market at a reasonable cost.

Other objects of the invention will appear in the following detailed description taken in connection with the accompanying drawings forming a part of this specification, and in which drawings:

Figure 1 is a perspective view of an automobile having the improved tractor attachment associated therewith.

Figure 2 is a side elevation of the improved tractor attachment.

Figure 3 is a top plan view of the tractor attachment showing parts of the same in section so as to disclose the interior portions thereof.

Figure 4 is a longitudinal section taken on the line 4—4 of Figure 3, showing one of the tractor members in elevation.

Figure 5 is a detail front elevation of one of the tread members showing a part of the same in section.

Figure 6 is a side elevation of one of the gripping drums showing one of the sections in open position, another in partially open position, and the remaining section in its permanent position.

Figure 7 is a side elevation of one of the gripping drums showing parts of the same in section.

Figure 8 is a detail section taken on the line 8—8 of Figure 7 showing the sections in locked position.

Figure 9 is a large detail view of one of the lock members for the sections of the gripping drum.

Figure 10 is a large detail section through the gripping drum showing one of the sections in partly opened position.

Figure 11 is a large detail side elevation of one of the bull traction wheels.

Figure 12 is an end elevation of the same.

Figure 13 is a detail section on the line 13—13 of Figure 11 showing the clutch mechanism in dotted lines.

Figure 14 is a detail side elevation of the clutch mechanism.

Figure 15 is a transverse elevation of the same.

Figure 16 is a detail transverse section on the line 16—16 of Figure 15.

Figure 17 is a transverse section through one of the envelope plates taken on the line 17—17 of Figure 18.

Figure 18 is a side elevation of one of the envelope plates.

Figure 19 is an elevation of one of the drive sprocket wheels, and

Figure 20 is a section on the line 20—20 of Figure 19.

Referring to the drawings, in detail, wherein similar reference characters designate corresponding parts, throughout the several views, the letter A indicates an automobile having the improved tractor attachment B connected therewith. The automobile A may be of any desired make, style or size, and includes the body 25, the front wheels 24, and the rear drive wheels 27 having the usual pneumatic tires 28 connected therewith with which the tractor attachment B is adapted to engage.

The tractor attachment B includes a pair of grip drums C mounted on a rotatable shaft D carried by the elevating frame E having a raising and lowering means or jack. The elevating frame E is carried for oscillatory movement on the rear axle F having associated therewith the pair of spaced casings or housings G carrying the drive or tread sections H, which are operatively connected by driving mechanism I with the grip drums C and have associated therewith the clutch mechanism J for throwing the drive or traction members H into or out of operation. The elevating frames E carry for movement therewith the gripping drums C and the semi-housings K which partially close the lower surface of the gripping drums C.

The gripping drums C are constructed identical with one another and one is adapted to engage one rear drive wheel while the other is adapted to engage the other rear drive wheel of the automobile A and each includes the disc or plate 29, which is keyed or otherwise rigidly secured to the inner terminal of the shaft D. The disc or plate 29 has an inwardly extending peripheral flange 30 forming a segment of a circle and a pair of movable sections 31 and 32 which form in connection with the flange 30 an annular body or drum for engaging the periphery of the tires 28 of the rear wheels 27 of the automobile.

The sections 31 and 32 each include right angular walls 33 and 34 and it will be seen that the walls 33 lie in substantially parallel relation with the disc 29 and engage the outer face of the same when the sections are moved in their closed or operative position.

The outer edge of the disc 29 has the portion thereof lying between the edges of the stationary flange 30 provided with teeth 35, which are adapted to engage the teeth 36 formed on the outer edge of segmental plates 37 secured to the inner faces of the walls 33 of the sections 31 and 32 at the outer edge thereof, so that when the sections are moved into locked position, movement circumferentially around the disc 29 by the sections 31 and 32 will be eliminated. A retaining lip 38 is carried by the segmental plates 37 and extends below the lower edge of the same so as to eliminate the lateral movement of the sections in relation to the disc 29 when the sections are in their locked positions.

The inner faces of the walls 34 of the sections 31 and 32 and the flange 30 are provided with equi-distantly spaced gripping fingers 39 having flexible friction pads 40 secured to their outer faces for engaging the periphery of a tire so as to firmly grip the same. The friction pads 40 may be made of any suitable material such as rubber or the like. The disc 29 is provided with a segmental reinforced extension 41 formed on its outer face extending from the central axis of the disc to the outer edge thereof, and the same extends from one end of the flange 30 to the other, and the sections 31 and 32 are adapted to extend flush with the same when the sections are in their closed positions. A pair of parallel spaced toggle clamps 57 are provided for each of the sections 31 and 32 and each of the toggle clamps include arms 42 and 43, which have their outer terminals secured to the inner edge of the walls 33 of the sections 31 and 32 and the disc 29 by pivot pins 44 and 45. The pivot pin 45 is positioned on the disc 29, a proper distance from the periphery thereof and just within the line of juncture of the walls 33 and the disc 29 when the segments 31 and 32 are in closed position.

The inner terminals of the arms 42 and 43 are pivotally connected together by means of the pivot pin 46 and the arm 43 is provided at its lower end with extensions forming a retaining ear 47, which is adapted to be engaged by rotatable locking member 48 mounted on a pin 50 threaded or otherwise secured to the outer face of the disc. The locking members 48 include an annular body having an annular extending flange 51 formed on the outer edge thereof behind which the ear 47 is adapted to engage. A portion of the flange 51 is notched as at 52 so as to receive the ear 47 during the final positioning of the sections 31 and 32. After the sections are in their closed positions, the locking members 48 are turned so as to move the notch out of the path of the ear 47. The toggle clamps permit the sections to be moved inwardly over a tire and then downwardly into tight engagement therewith.

The shafts D which carry the gripping drums C are each of the stub type and are mounted in suitable bearings 49 secured to the upper surface of the elevating frame E at the outer ends thereof.

The elevating frames E include pairs of spaced parallel beams 53 and 54 respectively, which extend rearwardly from the grip drums C to the rear axle F and the terminals of the same are bent downwardly as at 55 and are provided with housings 56 for the reception of the shaft, and the shaft is keyed or otherwise rigidly secured thereto. The forward terminals of the pairs of beams 53 and 54 are provided with right angularly depending extensions 58, the inner surfaces of which are formed smooth to provide a sliding bearing surface against the plates 21 attached to envelope plates 59, thereby allowing vertical action and at the same time preventing lateral motion between the elevator frames E and the tread member H, thereby retaining the elevator frames and the tread member H in proper alignment relative to each other.

Positioned intermediate each pair of the elevating beams 53 and 54 are the rectangular spaced enveloping plates 59 which form the housing G, for the track or tread mechanism H. The rear terminals of the plates are provided with relatively large openings 60 through which the rear shaft F extends and these openings are surrounded by an annular reinforcing bearing flange 61, the purpose of which will be hereinafter more fully described. The forward ends of the enveloping plates 59 are provided with registering openings 62, which support the forward shafts 63 which extend transversely across the tractor members from the outside enveloping plates to the inside enveloping plates of each member, to which they are firmly attached by keying or other method. The plates 59 gradually increase in width toward their rear ends so as to conform to the inclination of the upper run of the drive chains H.

The plates 59 are held in their spaced relation by suitable retaining bolts and sleeves, as may be desired.

The track or tread mechanism H includes the relatively large bull sprocket wheel 65, which is rotatably mounted on the rear axle F for independent movement and is arranged adjacent the rear end of the casing, intermediate the plates 59. The side faces of the large bull wheel 65 have annular grooves 66, which are adapted to receive the annular enlargements 61 formed on the inner faces of the plates 59 and these annular enlargements form supplemental bearings on the bull wheel. The peripheries of the bull wheels adjacent the outer edges thereof are provided with guard flanges 67 which hold the track tread from slipping laterally thereof. A plurality of equi-distantly spaced teeth 68 are arranged on the peripheries of the bull wheels intermediate the side flanges thereof and form means for engaging the links of the tread chains 69. The tread chains 69 may be of the ordinary or any preferred type used in caterpillar tractors and have spaced cleats or spurs 70 secured to the outer surface thereof so that the same may attain a firm grip on the ground. The shafts 63 which are carried by the forward ends of the spaced plates rotatably carry the relatively small wheels 71 and the tread chain 69 is trained around the same. The small wheels 71, carry a face and guide flanges similar to that of the bull wheels 65, but gear teeth are not provided thereon. These wheels 71, serve only as idlers in the drive mechanism. The shaft F has also mounted thereon, for independent rotation, the drive sprocket wheels 72, which are arranged on the shaft between the outer enveloping plates 59 and the inner side of the elevating beam E. The shafts D which carry the drums C have rigidly secured to their outer ends relatively small sprocket wheels 74 and a drive sprocket chain 75 is trained around the wheels 72 and 74.

A clutch mechanism J is provided for locking each of the relatively large sprocket wheel structures 72 with its adjacent bull wheel 65 and the same includes a ring 76 and a plurality of equi-distantly spaced cylindrical arms 77 formed on the inner face thereof. The arms 77 are adapted to be slidably received in openings 78, which extend transversely through each bull wheel 65 at equi-distantly spaced points. The drive sprocket wheel 72 has one face thereof provided with concentric enlargements 79 having the spaced recesses 80 formed therein. The recesses 80 are adapted to align with the transverse apertures 78 formed in the bull wheel, and when the ring 76 is pushed inwardly the arms 77 will ride through the openings 78 and into the sockets 80, which will effectively lock the drive sprocket wheel and the bull wheel 65 together, thus permitting the operation of the said tread chain. The ring 76 is loosely mounted for rotary movement on a carrier ring 81 which allows divergent movement between it and the carrier ring when the device is swinging on the pin 87 in operating the clutch. The ring 76 has its outer face recessed at diametrically spaced points for the reception of the links 82, which are rotatably mounted on pins 83. The links 82 carry outwardly extending fingers 84, which are received in an annular groove 85 formed in the inner face of the ring 76. Thus it will be seen that the ring 76 is adapted for rotary movement around the carrier ring 81 and is held against lateral movement by the fingers 84. The lower end of the carrier ring 81 is provided with spaced ears 86, which receive the pivot pin 87, by means of which the carrier ring 81 is pivotally mounted upon one of the plates 59. The upper end of the carrier ring diametrically opposite the ears 86 is provided with an operating handle 88, by means of which the ring 81 is adapted to be swung on said pivot. It can be seen by moving the operating handle 88 inwardly or outwardly, the fingers 77 will be brought into or out of engagement with the sockets 80. The fingers 77 are adapted to be locked in their adjusted positions by means of a dog 89 and segmental rack 90. The segmental rack 90 extends through an opening 91 in the handle 88 and has its inner end secured to the enveloping plate 59.

The envelope plates are further held in spaced parallel relation by means of shafts 92 arranged at equi-distantly spaced points in a horizontal plane adjacent the lower ends of the plates and have rotatably mounted thereon the rollers 93 which are adapted to engage the upper face of the lower run of the drive or tread chains 69, so that the chains may effectively grip the ground at the entire lower run of the same. The slack in the upper run of the said chains 69 is supported by a pair of spaced rollers 94 mounted on the shafts 95 mounted between the plates. The rollers 94 rotatably engage the lower face of the upper run of the said chain.

Supplemental casings K are provided for the grip drums C, and the same partially embrace the lower ends of the same. Each of the supplemental casings or semi-housings K includes a pair of spaced plates 96 which have their lower and rear ends connected by an arcuate plate 97. The outer plates 96 of the semi-housings are firmly attached to the inside elevator beams which have reduced depending extensions 64, which form a seat to receive said plates. The rear ends of the plates are also rigidly secured to the transverse brace beam 98, which is rigidly connected to the inner beams for securing the inner beams together. The beams E are rigidly bound together, in pairs, near their forward terminals, by the binding plates 118, which are rigidly attached to their upper surfaces and which bridge or span the tread mechanism, allowing it to ride free between them. It is to be understood that any other bracing means may be provided if necessary. The forward ends of the semi-housings K are provided with inclined noses 99 which have the upper faces thereof serrated or roughened and form inclined runways for facilitating the positioning of the wheels, of an automobile in the grip drums C.

The forward terminals of the casings rotatably carry the transversely extending shaft 100, the outer ends of which have keyed thereto the drums or windlasses 101, which form a portion of the means for raising and lowering the elevating beams and the grip drums C. These drums or windlasses 101 have anchored thereto the lower terminals of a pair of spaced chains 102 which have their upper ends anchored to the upper terminals of hood sections 103 which partially enclose the forward ends of the enveloping plates 59. One of the drums 101 is formed relatively longer than the other and is provided with openings 104 for the reception of an operating lever 105, so that the drums may be readily rotated when it is desired to raise and lower the elevating beams.

The drums 102 are provided with locks 106 for holding the same in adjusted positions and these locks include the dogs 107 rigidly mounted on the outer terminals of the shaft 108, which is rotatably carried by the terminals of the semi-housings. The dogs 107 are adapted to engage the ratchet wheels 109 rigidly secured to the shaft 100. Thus it will be seen that when the dogs 107 engage the ratchet wheels 109 movement of the drums is prevented.

An operating means 110 is provided for forming an efficient means for releasing the dogs and includes the crank arm 111, keyed to the transverse shaft 112, which is rotatably supported by the enveloping plate. The outer terminal of the shaft 112 is extended beyond the outer face of one of the enveloping plates and has keyed thereto the operating lever 113 carrying the pawl 114 which is adapted to engage teeth of the arcuate rack bar 115 secured to the outer face of the enveloping plate. The upper end of the crank arm 111 has pivotally secured thereto the connecting rod 116 which extends parallel to the plate 59 and into the opening in the arm 117 secured to the shaft 108. The rod 116 is provided with an annular flange 119 so as to engage in the inner face of the arm 117, so that when the rod 116 is pushed forwardly by the lever 113, the shaft 108 will be rocked so as to move the dogs out of engagement with the ratchet wheels 109. The dogs 107 are held in engagement with the ratchet wheels by means of an expansion spring 120 which is coiled around the rod 116 and the terminals of the spring 120 engage the outer face of the arm 117 and inner face of the lock nut 121.

To prevent the tread or caterpillar chain from becoming clogged with mud or the like, suitable scraper plates 122 are provided for engaging the treads at the rear end thereof and the scraper plates are pivotally mounted intermediate their ends on pins 123 carried by the rearward extending ears 124 formed on the enveloping plates 59.

In operation of the improved device, the elevating frames E carrying the grip drums C are lowered, when it is desired to place the attachment in engagement with a motor vehicle, by releasing the dogs 107 from the ratchet wheels 109, and by inserting the operating lever 105 into the socket 104 formed in the drums 101 for the reception of the same. The drums 101 are rotated sufficiently to permit the forward ends of the inclined noses 99 coming into engagement with the ground. The sections 31 and 32 of the grip drums are then moved outwardly into an inoperative position over the elevating beams by operating the locks 48 so as to position the notches 52 in alignment with the ears 47 formed on the toggle clamps 57. To facilitate the rotating of the locks 48, the same are provided with openings 125 for reception of a tool such as a spanner wrench or the like. To facilitate the throwing back of the sections 31 and 32, the same are also provided with tool receiving sockets 126. After the sections 31 and 32 have been thrown out of alignment with the stationary sections 30 and over the elevating beams, the motor vehicle is backed up the runway and into the stationary section which forms a cradle for the reception of the same.

With the automobile in position in the stationary section, the movable sections 31 and 32 of the grip drums are moved into place over the treads of the tires of the rear wheels and between it and the fender. The toggle clamps 57 are forced downward and inward thereby gripping the tires firmly and preventing movement of the gripping drums circumferentially on the tires. The flanged keepers or locks 48 are then turned so as to position the ears 47 behind the flanges thereof and prevent displacement of the clamps. The grip drums C are then elevated to the desired height according to the ground over which the tractor is intended to be moved by moving the lever 105 to rotate the drums or windlasses 101.

The automobile is now ready for use as a tractor and is operated in the usual manner.

It is to be clearly understood, that in positioning the automobile in the tractor attachment, the clutches J are in locked position so that the outer ends of the fingers 77 are in the sockets 80, which locks the drive sprocket 72 with the bull wheel 65. Thus it will be seen that the grip drums C are in gear with the tread mechanism, so that they will not revolve at the moment of entry of the automobile wheel.

In detaching the automobile from the tractor attachment, the clutch mechanism J is thrown out of gear with the tread members and the grip drums C are revolved independently, by hand, to a proper point of exit. The tool insert holes 126 facilitate this rotation.

It will be readily understood, that in operation, when turning or driving in curved lines, the drive wheels of the automobile revolve inequally, so that at a time, when it becomes desirable to disconnect the automobile from the tractor attachment, the grip drums C may be in any position and for this reason, the clutch mechanism J is specifically provided.

After the grip drums C are revolved to the proper point for exit, the clutch mechanism J is locked with the tread members and the grip drum sections 31 and 32 are released and thrown out of alignment as heretofore described. The automobile is then driven out of the attachment.

The rear axle is provided with a suitable draw bar so that farm implements may be attached thereto. If so desired the draw bar may be rigidly attached to the elevating means or enveloping plates 59.

The supplemental frames K have secured between the plates 96 rollers 127 which are arranged in an arc of a circle concentric with the grip drums C and are adapted to engage the periphery of the drums for forming an additional support for the same.

From the foregoing description it can be seen that a portable tractor attachment is provided for automobiles of exceedingly simple and durable construction, which will entirely obviate the necessity of employing jacks or other auxiliary tools for lifting the automobile in position.

In practice, we have found that the form of our invention illustrated in the accompanying drawings and referred to in the above description as the preferred embodiment, is the most efficient and practical, yet realizing that the conditions concurrent with the adoption of our device will necessarily vary, we desire to emphasize the fact that various modifications, in details of construction, proportion and arrangement of parts may be resorted to when required, without sacrificing any of the advantages of our invention as set forth.

What we claim as new is:

1. A tractor attachment for the rear end of automobiles comprising ground engaging elements, rotatable grip drums arranged to support the drive wheels of the automobile, said grip drums constituting the sole means of connection between the attachment and the automobile, means for raising and lowering the drums and means operatively connecting the drums with the ground engaging elements.

2. A tractor attachment for the rear end of automobiles comprising ground engaging elements, rotatable grip drums arranged to support the drive wheels of the automobile, said grip drums constituting the sole means of connection between the attachment and the automobile, means for raising and lowering the drums, means for holding the drums in raised position, and means for operatively connecting the drums with the ground engaging elements.

3. A tractor attachment for the rear end of automobiles comprising ground engaging elements, rotatable grip drums arranged to support the drive wheels of the automobile, said grip drums constituting the sole means of connection between the attachment and the automobiles, means for raising and lowering the drums, releasable means for holding the drums in an adjusted position, and means for operatively connecting the drums with the ground engaging elements.

4. A tractor attachment for automobiles comprising a frame, elevating beams pivotally carried by the frame, automobile wheel grip means carried by the beams, drums for raising and lowering the elevating beams, and releasable means for locking the raising and lowering drums against accidental rotation.

5. A tractor attachment for automobiles comprising a frame, an axle carried by the rear end of the frame, axles carried by the forward end of the frame, bull gear wheels mounted on the rear axle, guide wheels carried by the front axles, tread chains trained around said bull gear wheels and said guide wheels, elevating beams mounted on the ends of the rear axle, automobile drive wheel engaging means carried by the elevating beams, means for raising and lowering the beams, and means for operatively connecting the drive wheel engaging means with the bull gear wheels.

6. In a tractor attachment for automobiles, a grip drum arranged to frictionally engage the drive wheels of an automobile including a stationary tire engaging section and laterally moving swinging tire engaging sections adapted to be swung into and out of tire engaging position.

7. In a tractor attachment for automobiles, a gripping drum arranged to engage the drive wheels of an automobile and including a stationary cradle section and laterally and outwardly moving swinging sections for locking the wheels in the cradle section.

8. In a tractor attachment for automobiles, a grip drum engaging the drive wheels of a motor vehicle including a disc, a stationary segmental section carried by the disc, movable sections hingedly carried by the disc and locking means carried by the disc for engaging the movable sections to hold the same against displacement.

9. In a tractor attachment for automobiles, a grip drum for engaging the drive wheels of an automobile including a disc, a stationary segmental section carried by the disc, movable segmental sections hingedly carried by the disc, and interlocking means carried by the outer edge of the disc and movable sections for holding the sections against relative movement around said disc.

10. In a tractor attachment for automobiles, a grip drum engaging the drive wheels including a disc, a stationary segmental attachment carried by the disc, movable segmental sections carried by the disc having angularly related walls, toggle clamps carried by the disc and movable sections, a lock for engaging the clamps to hold the same against movement when the movable sections are in their operative positions.

11. In a tractor attachment for automobiles, a frame, an axle carried by the rear end of the frame, axles carried by the forward end of the frame, bull gear wheels carrier by the rear axle, guide wheels carried by the front axles, tread chains trained around said bull gear and guide wheels, elevating beams mounted on the rear axle, grip drums carried by the forward ends of the elevating beams, means operatively connecting each grip drum with a bull wheel, a supplemental casing carried by the elevating beams and including the inclined runway arranged in alignment with the grip drum, a shaft rotatably carried by the supplemental casing, drums mounted on the last mentioned shaft, chains secured to the drums and to the frame, means for rotating the drums, and means for locking the drums against rotation.

12. In a tractor attachment for motor vehicles, a frame, a grip drum for engaging one of the rear drive wheels of a motor vehicle, the grip drum including a stationary section and laterally movable hinged sections, means rotatably connecting the grip drum with the frame, an inclined runway carried by the frame, means for raising and lowering said runway, the rigid section of the gripping drum being adapted for movement into alignment with the runway when a vehicle is being connected to or disconnected from the attachment.

13. In a tractor attachment for motor vehicles, a frame, ground engaging means carried by the frame, a motor vehicle ground wheel engaging grip drum carried by the frame for rotary movement including a stationary section, and laterally swinging movable sections, means connecting the grip drum with the ground engaging means, a hinged runway, means for raising and lowering the runway, the stationary section of the grip drum being adapted to be moved into alignment with the runway, when a motor vehicle is being connected to or disconnected from the attachment.

JOHN R. STEPHENSON.
OLIVER C. ARMSTRONG.